(12) United States Patent
Ford et al.

(10) Patent No.: US 9,236,739 B2
(45) Date of Patent: Jan. 12, 2016

(54) APPARATUS FOR INTERCONNECTING A SHIP WITH A PORT POWER GRID

(75) Inventors: Andrew Ford, Plano, TX (US); John Spencer Dale, Rockwall, TX (US); Dennis M. Braun, Davie, FL (US)

(73) Assignee: Unitron, L.P., Dallas, TX (US)

( * ) Notice: Subject to any disclaimer, the term of this patent is extended or adjusted under 35 U.S.C. 154(b) by 904 days.

(21) Appl. No.: 13/432,755

(22) Filed: Mar. 28, 2012

(65) Prior Publication Data
US 2013/0257143 A1    Oct. 3, 2013

(51) Int. Cl.
*B60L 1/00* (2006.01)
*H02J 3/00* (2006.01)
*B63J 3/04* (2006.01)

(52) U.S. Cl.
CPC ............. *H02J 3/005* (2013.01); *B60L 2200/32* (2013.01); *B63J 2003/043* (2013.01)

(58) Field of Classification Search
CPC .... H02J 3/05; B60L 2200/32; B63J 2003/043
See application file for complete search history.

(56) References Cited

U.S. PATENT DOCUMENTS

| 8,026,629 | B2 * | 9/2011 | Schmidt et al. | 307/9.1 |
| 2007/0135971 | A1 * | 6/2007 | Andarawis et al. | 700/292 |
| 2008/0238488 | A1 * | 10/2008 | Comisky et al. | 327/20 |
| 2011/0254493 | A1 * | 10/2011 | Pasuri et al. | 318/500 |
| 2011/0304207 | A1 * | 12/2011 | Sannino et al. | 307/38 |

FOREIGN PATENT DOCUMENTS

WO    WO 2010119057 A1 * 10/2010

OTHER PUBLICATIONS

Patent Cooperation Treaty; International Search Report and Written Opinion of PCT/US2012/064641; Mar. 12, 2013; 8 pages.
ABB (Power and productivity for a better world TM); Enabling the shore-to-ship connection Static Frequency Converters; on the Internet at http://www05.abb.com/global/scot/scot221.nsf/veritydisplay/9287317614ef4a1cc1257912002fe01f/$file/ABB%20converters%20-%20datasheet%20rev%20B.pdf.

* cited by examiner

Primary Examiner — Jared Fureman
Assistant Examiner — Joel Barnett
(74) Attorney, Agent, or Firm — Howison & Arnott, LLP

(57) ABSTRACT

An apparatus provides electrical power to a ship in port. A first interface interconnects the apparatus with a power grid of the port receiving an input power signal. A second interface interconnects the apparatus with an electrical power grid of the ship to provide an output power signal. Power conversion circuitry receives the input power signal at a first voltage level and generates the output power signal at a selected voltage level and at a selected frequency level responsive to the input power signal. Power control circuitry configures the operation of the power conversion circuitry to generate the output power signal at the selected voltage level and the selected frequency level.

30 Claims, 5 Drawing Sheets

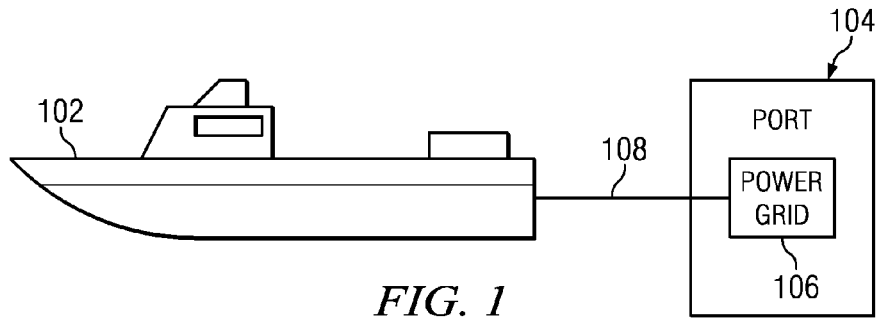
FIG. 1
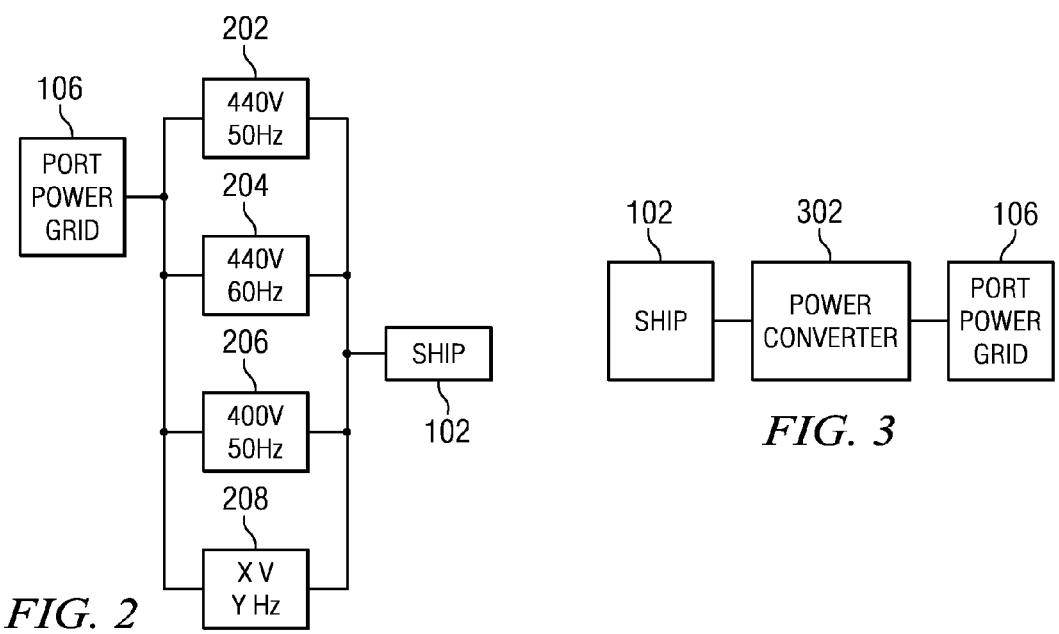
FIG. 2
FIG. 3
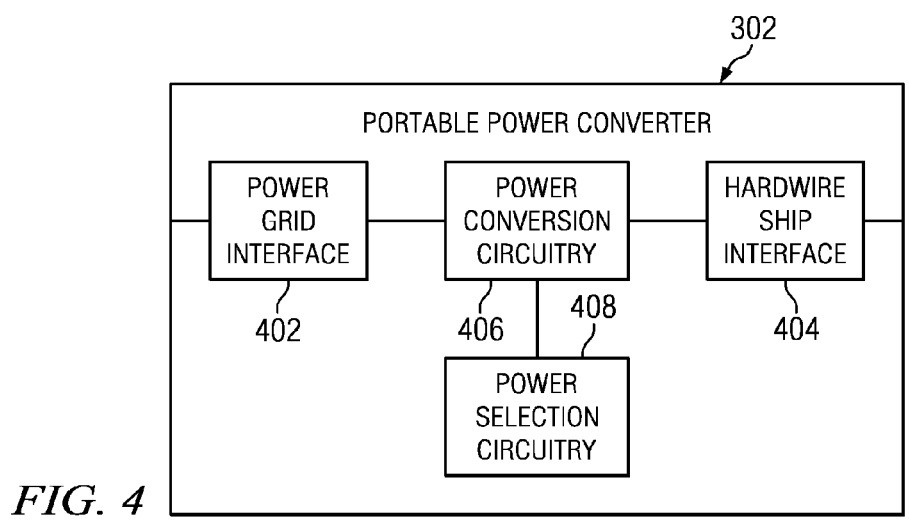
FIG. 4

US 9,236,739 B2

APPARATUS FOR INTERCONNECTING A SHIP WITH A PORT POWER GRID

TECHNICAL FIELD

The present invention relates to power converters, and more particularly, to a power converter which may be used for providing variable electrical power outputs to a ship from a port power grid.

BACKGROUND

When a merchant ship docks within a port, the ship has various options for meeting the electrical power requirements of the ship while it is in port. A first option is for the ship to continue to run the ship's engines and generators such that the ship provides its own electrical power while it is within port. However, within some situations, it is not reasonable or cost effective for the ship to continue to run its engines and generators while it is located within port. Also, local regulations may prevent the ship for running its engines and generators for extended periods of time while the ship is within port in order to overcome various environmental concerns. In these situations, the ship is required to interconnect with the local power grid that is provided by the port.

The ship will normally have its power system hardwired into the power grid such that the ship may receive power from the local power grid, and power its internal electrical systems. Problems arise when the electrical power requirements of the ship are different than those provided by the local power grid within the port. This prevents the ship from easily receiving electrical power. Thus, there is a need for some manner of providing various configurations of electrical power to a ship that is located within a port based upon the varying electrical power requirements of the ships within port.

SUMMARY

The present invention, in one aspect thereof, comprises an apparatus for providing electrical power to a ship docked in a port. A first interface interconnects the apparatus with a power grid of the port to receive an input power signal. A second interface interconnects the apparatus with an electrical power grid of the ship to provide an output power signal. Power conversion circuitry receives an input power signal at a first voltage level and generates the output power signal at a selected voltage level and at a selected frequency responsive to the input power signal. Power control circuitry configures the operation of the power conversion circuitry to generate the output power signal at the selected voltage level and the selected frequency level.

BRIEF DESCRIPTION OF THE DRAWINGS

For a more complete understanding, reference is now made to the following description taken in conjunction with the accompanying Drawings in which:

FIG. 1 illustrates a ship that is interconnected with a power grid of a local port;

FIG. 2 illustrates the various options for providing power between a port power grid and a ship docked therein;

FIG. 3 generally illustrates the manner in which a power converter may be connected between a ship and a port power grid in order to provide power there between;

FIG. 4 is a functional block diagram of a portable power converter used for interconnecting a ship with the port power grid;

DETAILED DESCRIPTION

Figure 5:
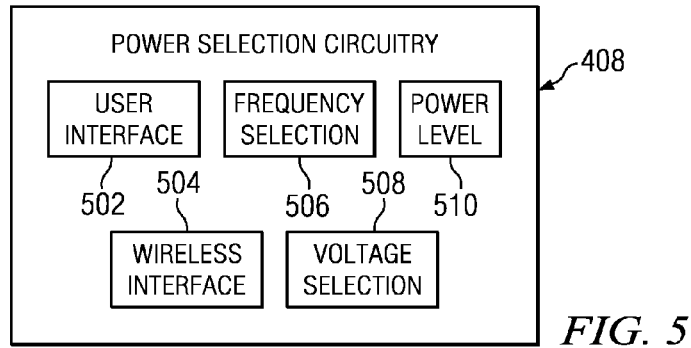
FIG. 5 is a functional block diagram of the power selection circuitry enabling control of the power conversion circuitry of the portable power converter of FIG. 4.

Referring now to the drawings, wherein like reference numbers are used herein to designate like elements throughout, the various views and embodiments of a power conversion unit for use between ship and port power grid are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a merchant ship 102 that is docked within a port 104. In order to provide electrical power to the ship 102, the port provides an interconnection 108 between the ship 102 and the local power grid 106. The problem with the interconnection 108 between the ship 102 and the power grid 106 is the differing voltage and frequency requirements that often occur. The power grid 106 of the port 104 may provide voltages at a particular power and frequency. However, the ship 102 may be from a different country and have different electrical power requirements with respect to voltage and frequency than those that are provided by the port 104.

Referring now to FIG. 2, there is more particularly illustrated the problems for interconnecting a ship 102 with the port power grid 106. In a preferred embodiment of the portable power conversion unit of the present disclosure, the connection between the port power grid 106 and the ship 102 will have the capability of providing power at a number of different voltage levels and frequencies in order to accommodate the differing needs of ships 102 which may come into a particular port. Thus, the portable power converter ideally provides at least a 440-volt 50-hertz power connection 202, a 440-volt 60-hertz power connection 204, and a 400-volt 50-hertz connection 206. In alternative configurations in the portable power converter could provide a power connection 208 providing X-volts and Y-hertz, where X equals any desired voltage level and Y equals any desired frequency level for the power connection between the port power grid 106 and the ship 102. In this manner, by providing a portable power converter that may provide a variety of voltage and frequency power configured signals between the port power grid 106 and a variety of ships having differing power requirements from differing countries may be supported.

Referring now to FIG. 3, there is illustrated the functional interconnection between a ship 102 and port power grid 106 through a portable power converter 302. As described previously with respect to FIG. 2, the portable power converter 302 is capable of receiving whatever electrical power is provided by the port power grid 106 in converting this into electrical energy that is usable by the ship 102. This would involve the portable power converter 302 converting the electrical power from the port power grid 106 to a voltage level and frequency level that may be utilized by the electrical systems of the ship 102. The circuitry of the portable power converter 302 is stored within a shipping container-sized unit that enables the portable power unit 302 to be easily moved about the port. This is due to the fact that the port already includes machinery that may easily move shipping containers about the port to both load and unload ships. Thus the same equipment may be utilized in moving the portable power converter to locations in which its operation is necessary.

Referring now to FIG. 4, there is illustrated a functional block diagram of the portable power converter 302. The portable power converter 302 contains a power grid interface 402 that enables the portable power converter to interconnect with the local power grid within the port. The power grid interface 402 comprises some type of plug or receptacle into which the portable power converter 302 is plugged into the local power grid, or alternatively, comprises an interface for hardwiring the portable power converter into the local power grid. A hardwire ship interface 404 enables the portable power converter 302 to be hardwired to the electrical power systems of the ship that is docked within the port. Due to the variety of the power requirements of ships with which the portable power converter may interact and the amount of electrical power that is being provided from the portable power converter, a hardwire interface is normally provided between the ship and the portable power converter 302. However, in alternative embodiments, some type of standardized or unique power plug or power connector may be used for interfacing the portable power converter 302 with the electrical power systems of an associated ship.

Power conversion circuitry 406 provides for conversion of the electrical energy provided from the local power grid received through the power grid interface 402 to a format that may be utilized by a ship interconnected with the hardwire ship interface 404. The power conversion circuitry 406 has the ability to convert to a variety of different power signatures having a desired voltage level and frequency level such as those illustrated with respect to FIG. 3, or any other type of unique combination of voltage and frequency that may be required for powering a particular ship.

Power selection circuitry 408 provides a user interface enabling the user to control the operation of the power conversion circuitry 406 by selecting a desired voltage level and frequency for providing the desired power signature to a connected ship. The control may be carried out locally at the portable power converter or remotely in a wireless connection.

Referring now to FIG. 5, there is illustrated a functional block diagram of the power selection circuitry 408. A user interface 502 provides a user touch screen or keyboard enabling a user to select the various power conversion parameters with respect to the portable power converter 302. Additionally, a wireless interface 504 enables the various control functions to establish the power conversion factors for the power conversion circuitry 406 be received via the wireless interface 504. In this manner, various parameters for controlling the operation of the power conversion circuitry 406 may be remotely provided to the portable power converter 302 utilizing a wireless connection through the wireless interface 504.

The power selection circuitry 408 provides a number of selection functionalities enabling control of the output of the portable power converter 302. Frequency selection functions 506 enable the power selection circuitry 408 to select the particular frequency at which the power is being provided from the portable power converter 302 to an associated ship. The frequency selection functions 506 may be implemented in hardware, software or various combinations thereof. In a preferred embodiment the frequency selection functions 506 will enable selection of either a 50-hertz frequency or a 60-hertz frequency. However, it should be realized that additional frequencies for other configurations required by various ships may be utilized.

The voltage selection function 508 enables the selection of a particular voltage to be provided from the power conversion circuitry 406. The voltage selection functions 508 may be implemented in hardware, software or various combinations thereof. The voltage selection function 508 in a preferred embodiment will enable the selection of either a 440-volt or a 400-volt output from the portable power converter 302. However, additional voltage levels may also be utilized to meet unique or new voltage requirement situations that are associated with ships that may be within that port and connected to the portable power converter 302.

Finally, the power level selection functionality 510 enables a user to select the various power levels that are to be provided from the portable power converter 302. The power level selection function 510 may be implemented in hardware, software or various combinations thereof. In an energy saving operation mode, the power required to be provided by the portable power converter 510 may not require the entire power output of the converter and some power conversion units within the device may be shut down. When selecting the energy saving operation mode only those power converters 510 that are needed to provide a particular power level are used. Within the power level selection functionality 510 control is also provided to enable additional converter 302 to be automatically added when the load demand increases. In this manner, the benefits of power savings may be obtained until additional load demand requires increased power. Additionally, the power level requirements may be selected in such a manner that more than a single output could be provided from the portable power converter or other types of power levels may be established as desired.

Figure 6:
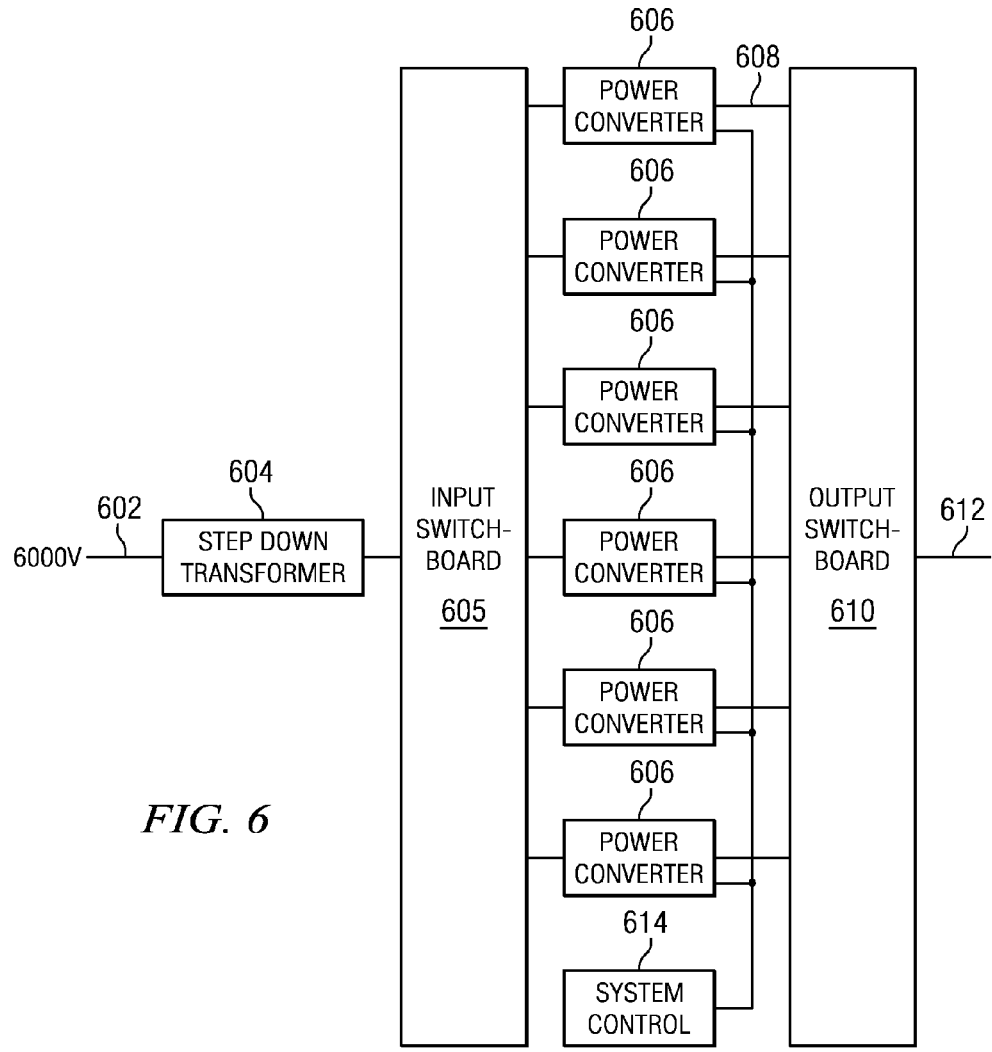
FIG. 6 more particularly illustrates the configuration of the portable power converter.

Referring now to FIG. 6, there is more particularly illustrated the power conversion circuitry 406. A 6,600-volt input 602 will normally be provided from the electrical power grid of the port at which the ship has docked. This 6,600-volt input (other voltage levels are, of course, possible) is provided to a step-down transformer 604 which down-converts the voltage level to approximately 480 volts. The step-down transformer 604 merely comprises a transformer having the 6,000-volt power grid signal provided at its input and a 480-volt output voltage provided from its output. The 480-volt output from the step-down transformer 604 is provided to the input switchboard 605. The input switchboard 605 provides a plurality of input switches for connecting the output of the step down transformer 604 to one of a plurality of power conversion unit 606. Each input of one of the power conversion units 606 includes an associated switch that may be opened or closed to provide the output from the step down transformer 604 to the power converter 606. Each of the power conversion units 606 are programmed to provide a 440-volt output or a 400-volt output on an output line 608. The power conversion units 606 are hot swappable enabling the units to be taken out of service without affecting the overall operation of the system other than reducing the system capacity. Each of the output lines 608 carrying the 440-volt signal or the 400-volt signal are connected to an output bus 612 through an output switchboard 610 which will provide the output voltage to a connected ship. The output switchboard 610 includes a separate output switch associated with each of the outputs of the power converter unit 606. By individually turning on and off the switches the output from the power converter 606 may be combined onto the output power bus 612. The power conversion units 606 will not each provide both of the 400-volt outputs and the 440-volt outputs at all times. The power conversion units 606 will be programmed to provide either one of the 400- or 440-volt outputs depending upon the electrical power needs of a connected ship. Additionally, each of the power conversion units 606 will provide the selected output voltage, either 400 or 440, to the output bus 612 at a selected frequency. The voltage and frequency to be provided by the power converter units 606 is controlled by a system control block 612 which provides the control signal to cause the power converter unit 606 to generate the output voltage at the desired voltage and frequency.

Figure 7:
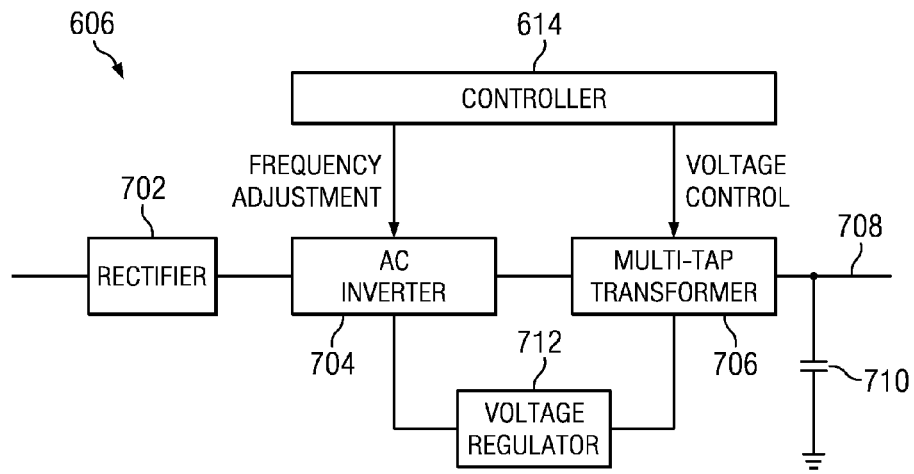
FIG. 7 is a functional block diagram of each of the power conversion units that are used within the portable power converter.

Referring now to FIG. 7, there is more particularly illustrated a functional block diagram of the power conversion units 606 of FIG. 6. The signal from the step-down transformer 604 is applied to a first input of a rectifier 702 that rectifies the AC signal from the step-down transformer 604 to a DC signal. The DC converted signal is provided as an input to an AC inverter 704. The AC inverter 704 additionally receives a frequency adjustment control signal that controls the frequency at which the signal will be generated by the AC inverter 704. The AC inverter 704 generates an AC output signal at the indicated frequency which is provided to a multi-tap transformer 706. The multi-tap transformer 706 receives the input AC voltage signal and provides a plurality of outputs 708. The multi-tap transformer 706 has an input side that receives the AC voltage from the AC inverter 704. The output side of the multi-tap transformer includes a tap point associated with each of the outputs 708. Each of the individual tap points provides a voltage at a desired level. In the present example, the multi-tap transformer will provide a 400-volt output signal on a first tap, and a 440-volt signal on a second tap. Each of these voltages is provided on the output lines 708. A capacitor 710 connects between each of the output voltage lines 708 and a reference voltage, which in one embodiment may be ground.

A voltage regulator 712 connects to each of the output lines 708 to monitor the output voltage being provided by the multi-tap transformer 708. A feedback signal is provided from the voltage regulator 712 to the AC inverter 704. This may be used to control the operation of the AC inverter 704 to control the output voltage levels being generator at the lines 708. A controller 612 provides the frequency adjustment signals to the AC inverter 704 and also controls the tap that is selected for output by the multi-tap transformer 706 to provide a desired voltage signal.

Figure 8:
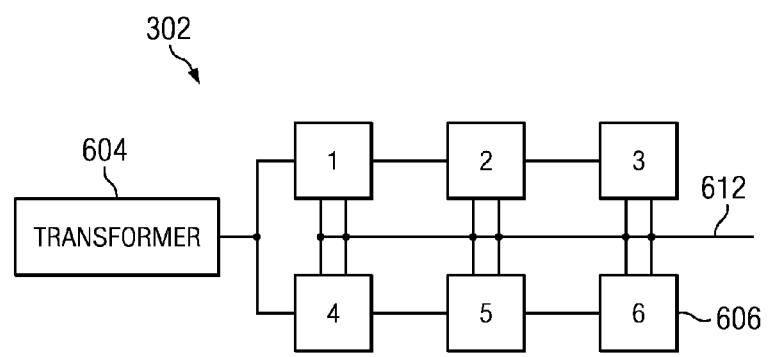
FIG. 8 illustrates the first configuration of the portable power converter wherein a portion of the power conversion units are disabled due to limited power needs of the portable power converter.
Figure 9:
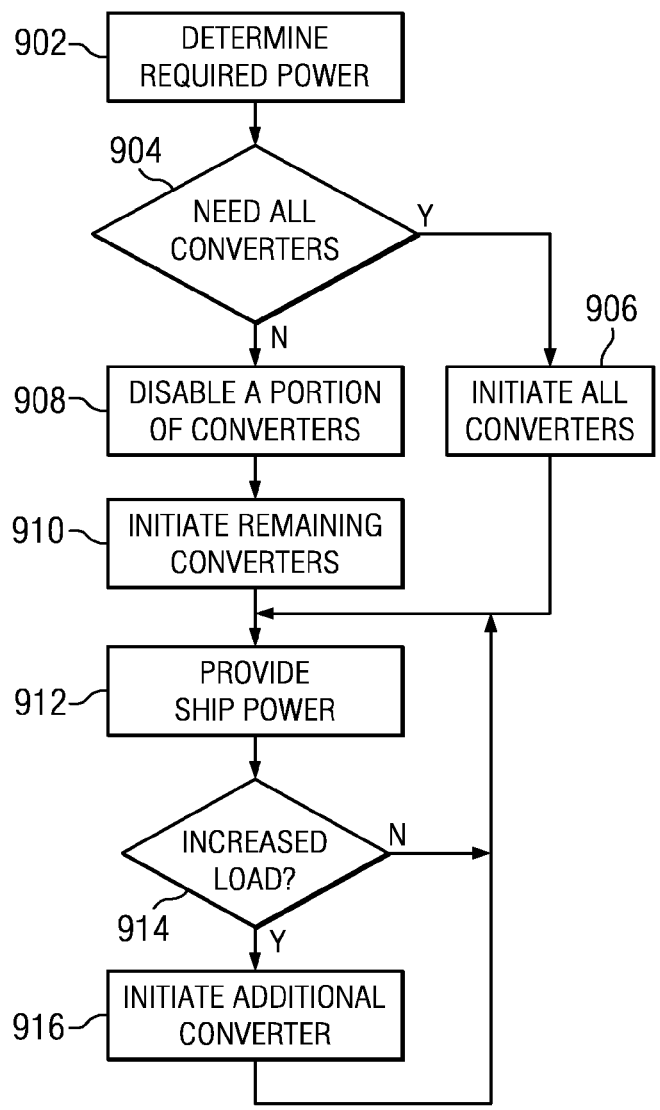
FIG. 9 is a flow diagram describing the operation for disabling power conversion units when power requirements are limited for the portable power converter.

Referring now to FIGS. 8 and 9, there is illustrated the operation of the portable power converter 302 when the power requirements of a connected ship do not require operation of each of the conversion units within the portable power converter 302. As described previously, within the energy saving operation mode, the transformer 604 down-converts the port power grid voltage applied thereto and outputs the voltage to each of a number of power conversion units labeled 1 through 6 in FIG. 8. The outputs of the conversion units are provided to an output power bus 612 that is connected to an associated ship. If the ship is small enough the total power output from each of the conversion units 606 may not be necessary. In a high power load mode of operation, each of the conversion units 1 through 6 must provide a balanced load power to the output power bus 612. However, if a lower power load requirement were being made on the output power bus 612 by an attached ship, a portion of the conversion units, for example, conversion units 4, 5, and 6, could be shut down only requiring the operation and use of conversion units 1 through 3. If the load demand increases while less than all of the conversion units 606 are operating, additional converter units may be added to meet the additional demand.

Referring now to FIG. 9, there is illustrated a flow diagram describing this manner of operation. The output power requirements on the power bus 612 are determined at step 902. Inquiry step 904 determines if these output power requirement necessitate the operation of all of the power converter units. If inquiry step 904 determines that all power converter units are needed then operation of all power converter units are initiated at step 906.

If inquiry step 904 determines that power from each of these power converter units 606 are not required, a portion of the power converter units are disabled at step 908 and operation of the remaining power converter units are initiated at step 910. Once the operation of either a portion of the power converter units are initiated at step 910 or all of the power converter units are initiated at step 906, the active units are used to provide power to a connected ship at step 912. If inquiry step 914 determines that the load level has increased, additional converters are turned on at step 916 to meet the increased load demand. If no increased load level is detected, control passes back to step 912.

Figure 10:
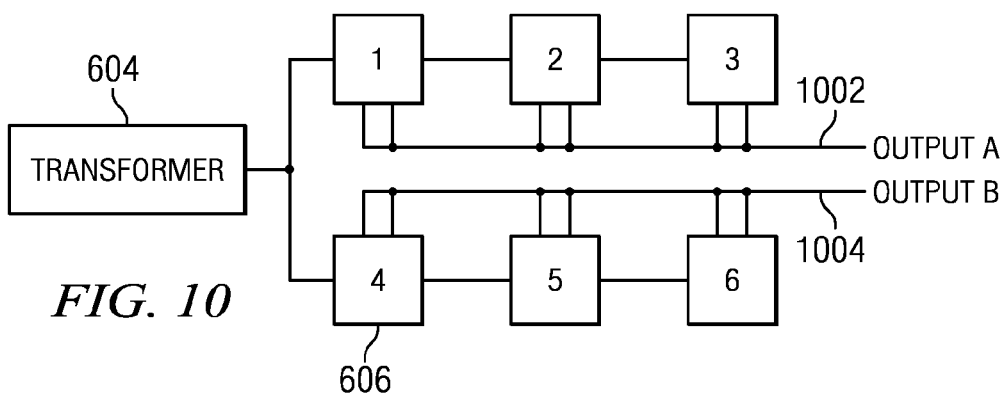
FIG. 10 illustrates a portable power converter having dual outputs.
Figure 11:
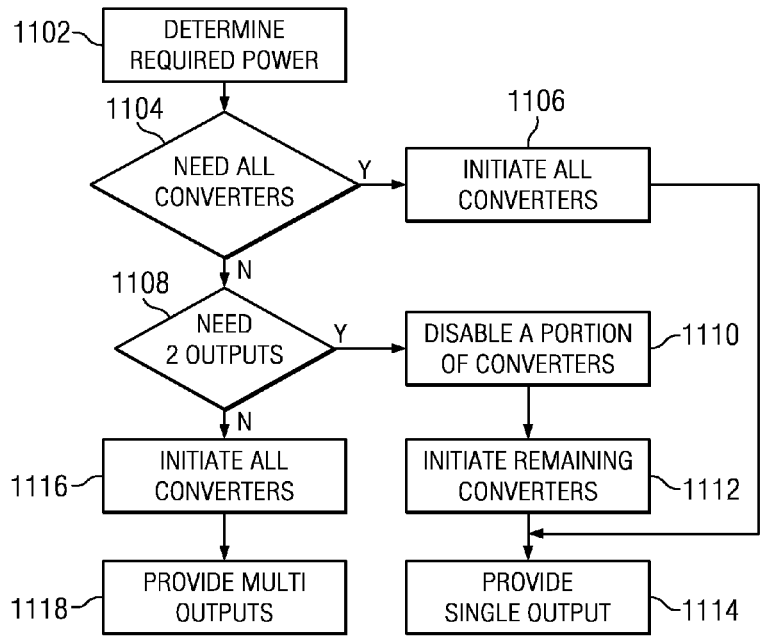
FIG. 11 is a flow diagram describing the operation of the portable power converter having dual outputs.

Referring now to FIGS. 10 and 11, in a further mode of operation, the portable power conversion unit 302 maybe configured to have multiple output buses 1002 and 1004. As before, the transformer 604 will provide a 480-volt signal from the port power grid to each of the converter units 606 labeled 1 through 6. In the illustration of FIG. 10, converter units 606 labeled 1 through 3 are connected to a first output bus 1002 and converter units 4 through 6 are connected to a second output power bus 1004. The output buses 1002 and 1004 may be controlled via some type of internal switching that enables the dual output mode wherein a separate power signal may be provided from power lines 1002 and 1004, or may be configured such that each of the converter units 606 are each connected to a single output bus. The dual output buses 1002 and 1004 are useful in situations where the power requirements for a particular ship will not require the total power output of the entire portable power converter 302. If only a portion of the converter unit 606 may provide the necessary power for a connected ship, multiple ships can be connected separately to each of the power output buses 1002 and 1004 providing greater use of a single portable power conversion unit 302.

Referring now to FIG. 11, there is illustrated the operation of the portable power unit 302 in the dual output mode of operation. The power requirements for the ship or ships connected to the output power buses are determined at step 1102. Inquiry step 1104 determines if each of the converter units 606 are needed based upon the determined power requirements. If all of the converters are needed to provide the required power on a single output, all of the converters are initiated at step 1106 and provided as a single power output at step 1114. If inquiry step 1104 determines all converter units are not needed to provide a single output power, inquiry step 1108 determines if each power output is needed to provide power to connected ships. If so, all of the power converters are initiated at step 1116 and multiple outputs are provided from each of the power buses 1002 and 1004 at step 1118. If inquiry step 1108 determines that multiple outputs are not needed, a portion of the power converter may be disabled at step 1110 and the remaining converters are initiated at step 1112. A single power output is provided at step 1114 from either all of the initiated converters from step 1106 or only a portion of the initiated converters at step 1112.

Figure 12:
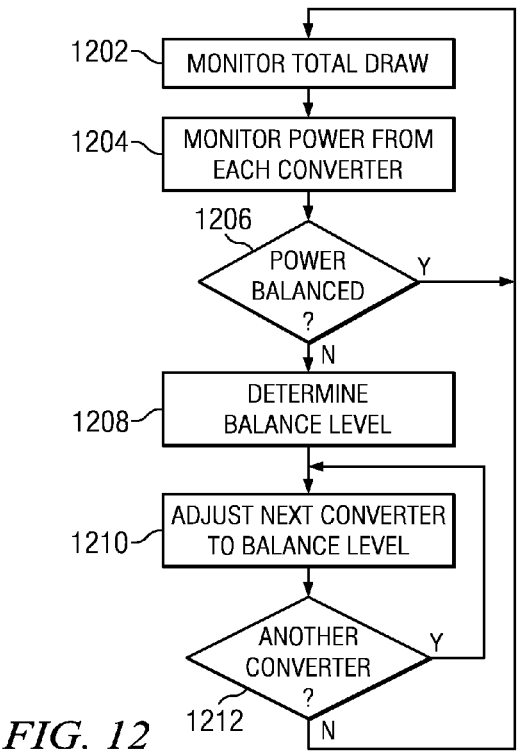
FIG. 12 is a flow diagram describing the manner in which the power output from each of the power converter units within the portable power conversion unit are balanced with each other to provide its output power.

Referring now to FIG. 12, there is illustrated the operation of the converter units within the portable power unit 302 in order to achieve a balanced load output from each of the converter units 606. The convert units 606 within the portable power converter 302 are configured to provide a balanced power load to the output power bus 612. Thus, during operation, no single converter unit 606 will provide a majority of the power voltage while the others provide substantially less power. The required mode of operation is that each of the converter units 606 will provide a substantially equal amount of power to the output power bus 612. The total power being drawn at the output bus or buses is monitored at step 1202 by a controller. The power output from each of the converter units is monitored at step 1204. Inquiry step 1206 determines if the power output from each of the converter units 606 is balanced and if so, control passes back to step 1202. If inquiry step 1206 determines there is an imbalance in the power being provided from each of the converter units 606, a balanced load level from each converter unit 606 necessary to provide the total power being drawn by the system is determined at the step 1208. Next, at step 1210 the first converter unit is adjusted to balance its power load level to the determined balance level from step 1208. Inquiry step 1212 determines if another converter unit exists that needs to be balanced and if so, control passes back to step 1210 to balance its load level. When inquiry step 1212 determines that no further power converter units exist for balancing, control passes back to step 1202.

It will be appreciated by those skilled in the art having the benefit of this disclosure that this power conversion unit for use between ship and port power grid provides selectable power supply signals to a ship based upon its power requirements. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus for providing electrical power to a ship in a port, comprising:
   a first interface for interconnecting the apparatus with a power grid of the port to receive an input power signal;
   a second interface for interconnecting the apparatus with an electrical power grid of the ship to provide an output power signal;
   power conversion circuitry including a plurality of power conversion modules, each power conversion module for receiving the input power signal at a first voltage level and for generating the output power signal at a selected voltage level and at a selected frequency level responsive to the input power signal; and
   power control circuitry for configuring operation of the power conversion circuitry to generate the output power signal at the selected voltage level and the selected frequency level, the power control circuitry further dynamically selecting a portion of the plurality of power conversion modules needed to provide a particular power level to the second interface responsive to changing power requirements at the second interface.

2. The apparatus of claim 1, wherein the power conversion circuitry further comprises:
   a transformer for stepping down the input power signal from a first voltage level to a second, lower voltage level; and
   an output power bus for providing as the output power signal a combined converted power signal from the plurality of power conversion modules.

3. The apparatus of claim 2, wherein the power conversion module further comprises:
   a power rectifier for converting the input power signal from an AC voltage signal to a DC voltage signal;
   an AC inverter for converting the DC voltage signal to a second AC voltage signal at the selected frequency level responsive to a frequency control signal;
   a multi-tap transformer for receiving the second AC voltage signal and providing the converted power signal at the selected voltage level and the selected frequency level responsive to a voltage control signal; and
   a controller for providing the frequency control signal and the voltage control signal responsive to control inputs.

4. The apparatus of claim 3, wherein the power conversion module further includes a voltage regulator for monitoring the converted power signal and providing a voltage control signal to the AC voltage regulator.

5. The apparatus of claim 2, wherein the power conversion circuitry generates a balanced power load from each of the power conversion modules converter circuits.

6. The apparatus of claim 2, wherein power control circuitry further dynamically disables at least one of the plurality of the power conversion modules when power requirements of the ship do not require power provided by a currently enabled number of power conversion modules.

7. The apparatus of claim 2 further including a second output power bus for providing a second output power signal from a first portion of the power conversion modules and wherein the output power bus provides the output power signal from a second portion of the power conversion modules.

8. The apparatus of claim 1, wherein the power control circuitry further comprises:
   a user interface for receiving user inputs for selecting the selected voltage level and the selected frequency level;
   voltage control logic for generating voltage control signals responsive to the user inputs; and
   frequency control logic for generating frequency control signals responsive to the user inputs.

9. The apparatus of claim 8, wherein the power control circuitry further comprises power control logic for generating power control signals responsive to the user inputs.

10. The apparatus of claim 8, wherein the user interface further comprises a wireless interface for receiving the user inputs for a remote location.

11. The apparatus of claim 8, wherein the user interface comprises a touch screen.

12. An apparatus for providing electrical power to a plurality of ships in a port, comprising:

a first interface for interconnecting the apparatus with a power grid of the port to receive an input power signal;
a second interface for interconnecting the apparatus with an electrical power grids of the plurality of ships to provide an output power signal;
a transformer for stepping down the input power signal from a first voltage level to a second, lower voltage level;
a plurality of power converter circuits for generating a converted power signal at a selected voltage level and a selected frequency level responsive to the input power signal at the second, lower voltage level, wherein each of the plurality of power converter circuits further comprises:
  a power inverter for converting the input power signal from an AC voltage signal to a DC voltage signal;
  an AC voltage generator for converting the DC voltage signal to a second AC voltage signal at one of a first selected frequency level and a second selected frequency level responsive to a frequency control signal;
  a multi-tap transformer for receiving the second AC voltage signal and providing the converted power signal at one of a first selected voltage level and a second selected voltage level responsive to a voltage control signal;
  a controller for providing the frequency control signal and the voltage control signal responsive to control inputs;
an output power bus for providing as the output power signal the combined converted power signals from the plurality of power converter circuits;
power control circuitry for configuring the operation of the plurality of power converter circuits to generate the output power signal at the selected voltage level and the selected frequency level, the power control circuitry further dynamically selecting a portion of the plurality of power converter circuits needed to provide a plurality of outputs each at a particular power level to the second interface responsive to changing power requirements at the second interface.

13. The apparatus of claim 12, wherein each of the plurality of power converter circuits further includes a voltage regulator for monitoring the converted power signal and providing a voltage control signal to the AC voltage regulator.

14. The apparatus of claim 12, wherein each of the plurality of power converter circuits generates a balanced power load from each of the plurality of power converter circuits.

15. The apparatus of claim 12, wherein a first portion of the plurality of power converter circuits are disabled when power requirements of the ship do not require power provided by all of the plurality of power converter circuits.

16. The apparatus of claim 12, wherein the power control circuitry further comprises:
a user interface for receiving user inputs for selecting the selected voltage level and the selected frequency level;
voltage control logic for generating voltage control signals responsive to the user inputs; and
frequency control logic for generating frequency control signals responsive to the user inputs.

17. The apparatus of claim 16, wherein the power control circuitry further comprises power control logic for generating power control signals responsive to the user inputs.

18. The apparatus of claim 16, wherein the user interface further comprises a wireless interface for receiving the user inputs for a remote location.

19. The apparatus of claim 16, wherein the user interface comprises a touch screen.

20. The apparatus of claim 12, wherein the selected voltages level may be either 400 volts or 440 volts.

21. The apparatus of claim 12, wherein the selected frequency level may be either 50 Hertz or 60 Hertz.

22. The apparatus of claim 12, wherein power control circuitry further dynamically disables at least one of the plurality of the power conversion modules when power requirements of the ship do not require power provided by a currently enabled number power conversion modules.

23. A method for providing electrical power to a ship in a port, comprising:
receiving an input power signal from a power grid of the port at a power conversion device at a first voltage level, the power conversion device including a plurality of power conversion modules for receiving the input power signal;
generating control signals to configure the power conversion device to dynamically select a portion of the plurality of power conversion modules needed to provide a particular power level output responsive to changing power requirements at the second interface and to convert the input power signal to an output power signal at a selected voltage level and a selected frequency level responsive to user inputs;
converting the input power signal to the output power signal at the particular power level output, at the selected voltage level and at the selected frequency level responsive to the input power signal and the control signals for the selected frequency level and the selected voltage level; and
outputting the output power signal to the ship.

24. The method of claim 23, wherein the step of converting further comprises:
stepping down the input power signal from a first voltage level to a second, lower voltage level;
generating a converted power signal at the selected voltage level and the selected frequency level responsive to the input power signal at the second, lower voltage level and the control signals from a plurality of power conversion modules;
combining at least one of the plurality of converted power signals into the output power signal; and
providing the output power signal on an output bus.

25. The method of claim 24, wherein the step of generating the converted power signal further comprises:
rectifying the input power signal from an AC voltage signal to a DC voltage signal;
inverting the DC voltage signal to a second AC voltage signal at the selected frequency level responsive to a frequency control signal;
transforming the second AC voltage signal to the converted power signal at the selected voltage level an the selected frequency level responsive to a voltage control signal; and
providing the frequency control signal and the voltage control signal responsive to the control signals.

26. The method of claim 24, wherein the step of generating the converted power signal further comprises generating a balanced power load from each of the plurality of power conversion modules.

27. The method of claim 24 further including the steps of:
determining a first portion of the plurality of power conversion modules are not required to meet power requirements of the ship during charging of the ship; and
disabling the first portion of the plurality of power conversion modules responsive to the determination while continuing to power the ship with a second portion of the plurality of power conversion modules.

28. The method of claim 24 further including;
combining a second portion of the plurality of converted power signals into a second output power signal; and
providing the second output power signal on a second output bus.

29. The method of claim 23, wherein the step of generating control signals further comprises:
receiving user inputs for selecting the selected voltage level and the selected frequency level;
generating voltage control signals responsive to the user inputs; and
generating frequency control signals responsive to the user inputs.

30. The method of claim 29, wherein the step of receiving further comprises a wireless receiving the user inputs from a remote location.

* * * * *